Figure 1:
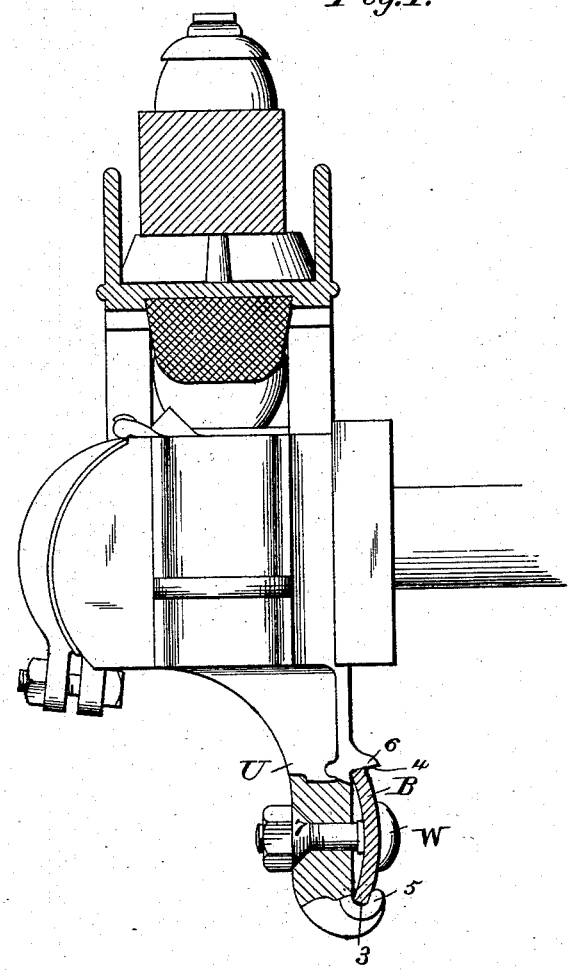

(No Model.)

2 Sheets—Sheet 1.

J. STEPHENSON.
GUARD ATTACHMENT FOR CITY RAILWAY CARS.

No. 284,254.  Patented Sept. 4, 1883.

Attest:
Cout A. Cooper
H. E. Hansmann

John Stephenson
Inventor:
By Chas. E. Foster,
Atty

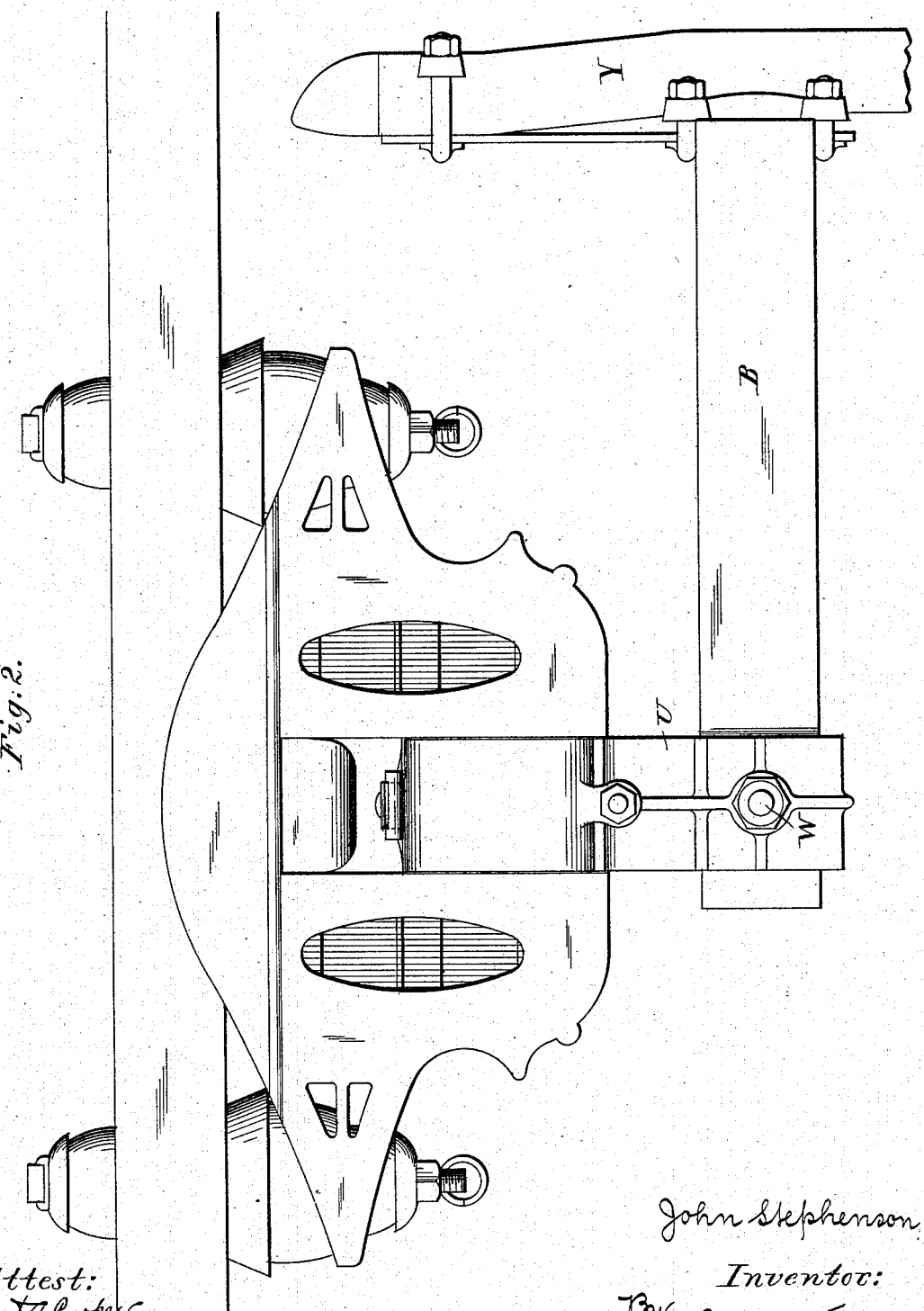

UNITED STATES PATENT OFFICE.

JOHN STEPHENSON, OF NEW YORK, N. Y.

GUARD ATTACHMENT FOR CITY-RAILWAY CARS.

SPECIFICATION forming part of Letters Patent No. 284,254, dated September 4, 1883.

Application filed April 25, 1883. (No model.)

*To all whom it may concern:*

Be it known that I, JOHN STEPHENSON, a citizen of the United States, and a resident of the city, county, and State of New York, have invented certain new and useful Improvements in Guard Attachments for City-Railway Cars, of which the following is a specification.

My invention relates to that class of safety devices for street-railway cars in which an arm supported by some part of the running-gear carries a guard arranged in front of or adjacent to the wheel; and my invention consists in certain means, hereinafter fully described, whereby to securely attach the said arm to the support.

In the drawings, Figure 1 is a side view, partly in section, showing the box and axle of a city-railway car, and the guard-supporting arm connected thereto. Fig. 2 is a front view.

The guard-supporting arm B carries a guard, Y, of any suitable form, and which is held by the arm B in any position in respect to the wheel which may be deemed most advisable. The arm B is connected at the rear end to some stationary portion of the running-gear, preferably to a pendant, U, extending from the under side of the box.

As ordinarily constructed, the fastening device connecting the arm to the pendant has not been sufficiently secure to overcome the effects of the constant jarring of the wheels. This I remedy by providing the pendant at one side—preferably at the rear—with a flange, 5, bent to form a channel, 3, and with a parallel upper flange, 6, having an inclined lower face, 4, and I bend the arm B transversely to form an arch abutting in the groove 3 and against the shoulder 4, and I extend the securing-bolt W through the pendant and through an opening in the center of the arm, so that when the said bolt is tightened, the pressure will tend to straighten the arch and expand it into firm contact with its parallel bearings. This not only clamps the arm B to its bearings so securely as to prevent all vibration and rattling, but it also secures a spring-pressure upon the bolt, which tends to maintain the nut in contact with the pendant, and thereby prevent said nut from turning. To more securely retain the nut in its position, I form the same with a conical inner end, 7, adapted to a corresponding socket formed by flaring or enlarging the outer end of the opening in the pendant, so that the spring-tension of the arm B will hold the cone firmly in its socket, affording an extended bearing that will prevent the nut from turning under the vibrations of the car.

Without limiting myself to the precise construction and arrangement of parts described, I claim—

1. The guard-supporting arm of a railway-car, bent transversely, in combination with a support connected to the car, and provided with parallel edges constituting the bearings for the edges of the guard-arm, and a transverse bolt connecting the said arm to its support to flatten it between its bearings, substantially as specified.

2. A car-axle box provided with a pendant having a groove and parallel beveled shoulder, adapted to receive between them the bent guard-supporting arm, substantially as set forth.

3. A car-axle box having a pendant arm with parallel bearings, a guard-supporting arm bent and in contact at its edges with said bearings, and a connecting-bolt arranged substantially as set forth.

4. A support for the guard-arm of a railway-car, provided with parallel bearings, and with a recess enlarged at one end, combined with an arm bent transversely, a connecting-bolt, and a nut having a conical head fitting the enlarged end of said recess, substantially as set forth.

In testimony whereof I have signed my name to this specification in the presence of two subscribing witnesses.

JOHN STEPHENSON.

Witnesses:
S. A. STEPHENSON,
AUGUST RIPPERGER.